D. B. SMITHSON.
ANIMAL POKE.
APPLICATION FILED NOV. 17, 1919.
1,346,272.
Patented July 13, 1920.
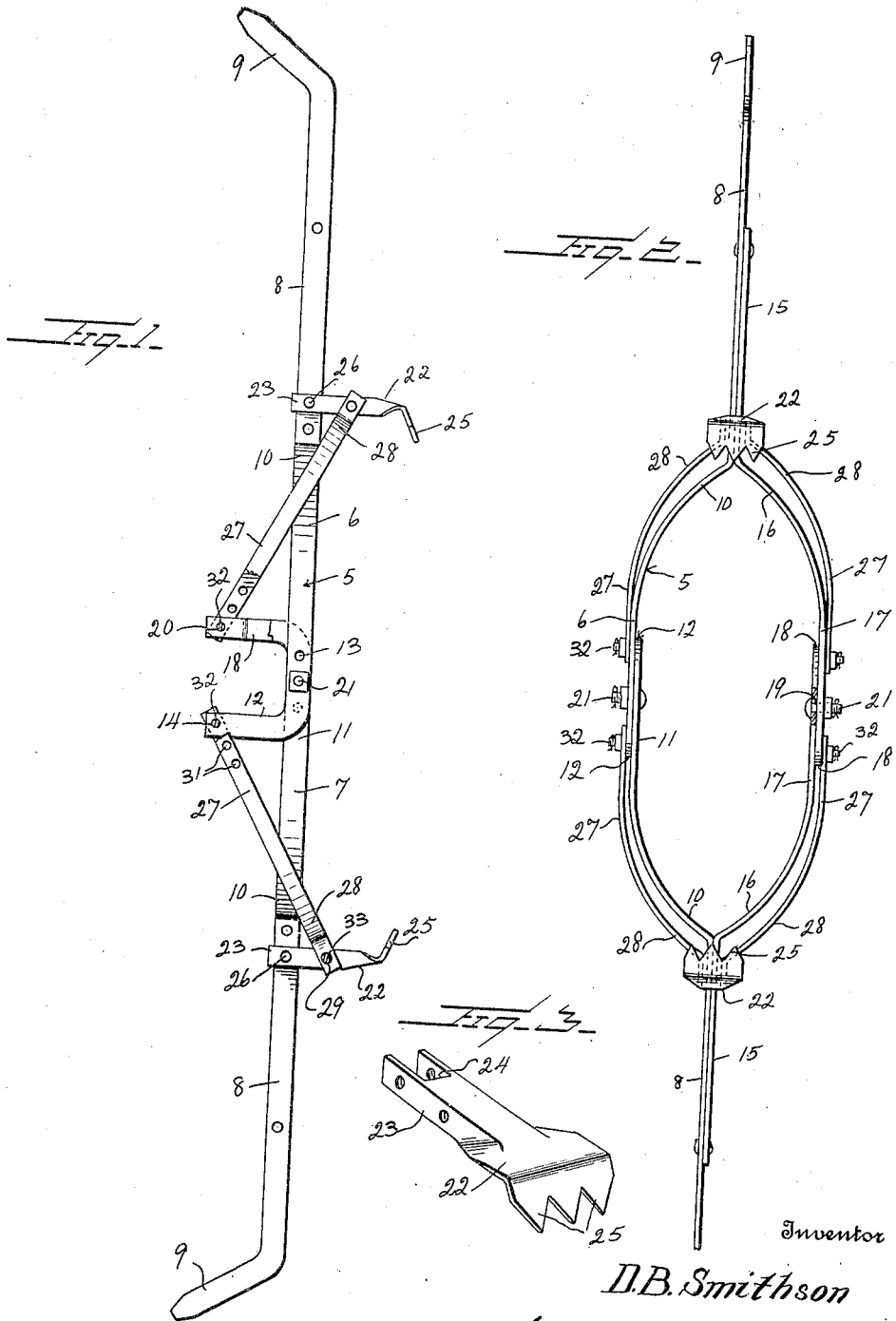

UNITED STATES PATENT OFFICE.

DAVID B. SMITHSON, OF WELLSTON, OKLAHOMA.

ANIMAL-POKE.

1,346,272.  Specification of Letters Patent.  Patented July 13, 1920.

Application filed November 17, 1919. Serial No. 338,713.

*To all whom it may concern:*

Be it known that I, DAVID B. SMITHSON, a citizen of the United States, residing at Wellston, in the county of Lincoln and State of Oklahoma, have invented certain new and useful Improvements in Animal-Pokes, of which the following is a specification, reference being had to the accompanying drawings.

This invention relates to animal pokes and has for its object the provision of a device of this character the parts of which are simultaneously operable to prevent an animal from jumping over, or breaking through the fence of an inclosure.

Another object is the provision of a device of this character including two contact members, each of which operates the parts carried by the other.

Another object is the provision of a device of this character including a sectional yoke including spurs, each spur being supported by one section of the yoke and operated by the other.

With these and other objects in view the invention consists in the improved construction and arrangement of parts to be hereinafter more particularly described, fully claimed and illustrated in the accompanying drawings, in which:—

Figure 1 is a side elevation of an animal poke constructed in accordance with my invention, Fig. 2 is a rear elevation, and Fig. 3 is a detail perspective of one of the spurs.

Referring to the drawings, 5 indicates a yoke composed of a pair of sections 6 and 7. Each section includes a contact bar 8 adapted to engage the fence or other barrier of the inclosure to actuate the device, the contact member including a hook 9 at its extremity. The other end of the contact member 8 is outwardly bowed as at 10 and has its end extending in parallel relation to the body portion 8 as at 11, the extremities of the portion 11 including an extension 12 which is extended outwardly in angular relation to the portion 11 to provide an operating arm. A plurality of pivot openings 13 are provided in the portion 11, while a pivot opening 14 is provided in the arm 12. Secured to the contact member 8 and diverging therefrom at the junction of the bowed portion 10 with the member 8 is an arm 15 which forms the other portion of the section. The arm 15 also is bowed outwardly as at 16 and extends in parallel relation to the main portion 15 as at 17, the extremity of the portion 17 including an extension 18 extending in angular relation to the portion 17 to provide an arm, the portion 17 being provided with pivot openings 19. The extension 18 is provided with a pivot opening 20, the purpose of which will be hereinafter explained.

Bolts 21 are passed through the registering openings 13 and 19 of each section to form the yoke 5.

In order to cause the animal to leave the vicinity of the fence after endeavoring to pass therethrough, a spur 22 is provided, and consists of a plate having its side marginal edges bent upwardly in spaced relation to each other to provide a shank 23, the rear portion 24 of the shank being furcated, while the forward portion of the plate is provided with a plurality of teeth 25. One of these spurs, is pivoted at its furcated end to each section of the yoke by means of a pivot pin 26 and is intended to swing inwardly to engage the flesh of the animal, when its effort to leave the inclosure, causes operation of the contact members 8.

This operation is accomplished by the provision of a plurality of links 27. Each link is inwardly bowed at one portion 28 and provided with an opening 29 while the other end portion 30 is provided with a plurality of openings 31 to permit the adjustment of the links, the links being bowed in order to conform to the contour of the sections of the yoke. The ends 30 of one pair of links are pivoted to the extensions 12 and 18 of one section by the bolts 32, the remaining pair of links being similarly connected to the other section. The ends 28 of the links of each section are pivotally connected to the intermediate portion of the shank 23 of the spur of the opposite section, by means of the pivot bolts 33.

The device is placed on the neck of the animal so that the extensions face forwardly while the spurs face rearwardly. In this position, should the animal attempt to break through or jump over the barrier of the inclosure, the contact members 8 will engage the barrier and be moved rearwardly by the animal, causing rocking motion of the sectional yoke on the bolts 21. This causes the extensions to move toward each other and through the medium of the links 27 force the spurs 22 into engagement with the flesh of the animal. When the contact members 8 are relieved of pressure, the spurs will be readily disengaged from the flesh of the animal.

From the foregoing it will be readily seen that this device provides a novel form of animal poke so constructed that the parts carried by one section are operated by the movement of the adjacent section so that should only one contact member come in engagement with a barrier, it will also cause the operation of the adjacent section. In this manner, the device never fails to operate and in view of its simplicity, can be manufactured from a small quantity of material. In addition to this every portion of the device performs an important function.

What is claimed is:—

1. An animal poke comprising two pivotally connected sections, said sections including contact members, spurs pivoted to said sections and a link movably connecting the spur of each section to the opposite section.

2. An animal poke comprising two pivotally connected sections, said sections including contact members, spurs pivoted to said sections and a link movably connecting the spur of each section to the opposite section, said links being operable by the sections to operate the spur.

3. An animal poke comprising a yoke including two sections pivotally connected to each other adjacent one of their end portions, extensions projecting from the end portions of said sections beyond the pivotal connection of the same, contact members carried by the other end of each section, spurs pivoted to said contact members and extending in the opposite direction to that of the extensions, and means pivotally connecting said extensions to the spurs.

4. An animal poke comprising a yoke including two sections pivotally connected to each other adjacent one of their end portions, extensions projecting from the end portions of said sections beyond the pivotal connection of the same, contact members carried by the other end of each section, spurs pivoted to said contact members and extending in the opposite direction to that of the extension, and a link carried by each extension and connected to the spur of the opposite section to oscillate said spur upon pivotal movement of said yoke.

In testimony whereof I hereunto affix my signature.

DAVID B. SMITHSON.